(12) United States Patent
Shetty

(10) Patent No.: US 12,437,347 B1
(45) Date of Patent: Oct. 7, 2025

(54) ENERGY USAGE TRACKING AND MANAGEMENT

(71) Applicant: West Corporation, Omaha, NE (US)

(72) Inventor: Santhosh Monappa Shetty, Omaha, NE (US)

(73) Assignee: West Technology Group, LLC, Omaha, NE (US)

( * ) Notice: Subject to any disclaimer, the term of this patent is extended or adjusted under 35 U.S.C. 154(b) by 178 days.

(21) Appl. No.: 16/527,298

(22) Filed: Jul. 31, 2019

(51) Int. Cl.
  *G06Q 50/06* (2024.01)
  *G06Q 10/1093* (2023.01)

(52) U.S. Cl.
  CPC ......... *G06Q 50/06* (2013.01); *G06Q 10/1095* (2013.01)

(58) Field of Classification Search
  CPC .... G06Q 50/06; G06Q 10/04; G06Q 30/0261; G06Q 30/0283; G06Q 30/0202; G06Q 10/06; G06Q 10/06315; G06Q 30/0206; G06Q 30/0269
  See application file for complete search history.

(56) References Cited

U.S. PATENT DOCUMENTS

| | | | |
|---|---|---|---|
| 11,333,378 B1* | 5/2022 | Limp | G06Q 50/06 |
| 2007/0203860 A1* | 8/2007 | Golden | G05B 15/02 705/412 |
| 2010/0146712 A1* | 6/2010 | Finch | G06Q 50/06 68/12.16 |
| 2011/0208369 A1* | 8/2011 | Yang | H02J 3/14 700/296 |
| 2011/0218691 A1* | 9/2011 | O'Callaghan | G06Q 50/06 700/295 |
| 2014/0277769 A1* | 9/2014 | Matsuoka | F24F 11/523 700/278 |
| 2016/0131382 A1* | 5/2016 | Rosen | F24F 11/62 700/278 |
| 2017/0256941 A1* | 9/2017 | Bowers | H02J 13/00004 |
| 2020/0184395 A1* | 6/2020 | Fabris | G06Q 10/06315 |

* cited by examiner

*Primary Examiner* — Rupangini Singh
*Assistant Examiner* — Jorge G Del Toro-Ortega

(57) ABSTRACT

One example method of operation may include determining one or more high energy usage events were initiated during a peak energy usage time interval of a period of time, determining whether a non-peak energy usage time interval is within a threshold range of the peak energy usage time interval, when the non-peak energy usage time interval is within the threshold range of the peak energy usage time interval, postponing at least a portion of the one or more high energy usage event during the peak energy usage time interval, and automatically re-initiating the one or more high energy usage events during the non-peak energy usage time interval.

6 Claims, 6 Drawing Sheets

ENERGY USAGE TRACKING AND MANAGEMENT

TECHNICAL FIELD OF THE APPLICATION

This application relates to monitoring of energy usage, and more specifically to energy usage tracking and management.

BACKGROUND OF THE APPLICATION

Conventionally, energy use in an office, home or business establishment may be performed with little concern for optimal use time periods. Certain efforts are common to reduce energy usage, such as water or electrical power usage, such as reduced water-flow faucets and light emitting diode (LED) lights. However, formal peak energy usage times and corresponding energy credits are largely ignored due to lack of awareness and incentives by the energy use customers.

SUMMARY OF THE APPLICATION

Example embodiments of the present application provide at least a method that includes one or more of determining one or more high energy usage events were initiated during a peak energy usage time interval of a period of time, determining whether a non-peak energy usage time interval is within a threshold range of the peak energy usage time interval, when the non-peak energy usage time interval is within the threshold range of the peak energy usage time interval, postponing at least a portion of the one or more high energy usage event during the peak energy usage time interval, and automatically re-initiating the one or more high energy usage events during the non-peak energy usage time interval.

Another example embodiment may include an apparatus that includes a processor configured to determine one or more high energy usage events were initiated during a peak energy usage time interval of a period of time, determine whether a non-peak energy usage time interval is within a threshold range of the peak energy usage time interval, when the non-peak energy usage time interval is within the threshold range of the peak energy usage time interval, postpone at least a portion of the one or more high energy usage event during the peak energy usage time interval, and automatically re-initiate the one or more high energy usage events during the non-peak energy usage time interval.

Another example embodiment may include a non-transitory computer readable storage medium configured to store instructions that when executed cause a processor to perform determining one or more high energy usage events were initiated during a peak energy usage time interval of a period of time, determining whether a non-peak energy usage time interval is within a threshold range of the peak energy usage time interval, when the non-peak energy usage time interval is within the threshold range of the peak energy usage time interval, postponing at least a portion of the one or more high energy usage event during the peak energy usage time interval, and automatically re-initiating the one or more high energy usage events during the non-peak energy usage time interval.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for methods, processes, devices, systems and non-transitory computer readable mediums which execute instructions to manage energy and resource usage. Each individual customer profile may represent a single building, home, office, etc., which is using utilities, such as electrical energy, water, gas, fuel, etc. A historical energy usage processor (HEUP) may be a computing device that receives, stores and processes usage of those resources, such as 'energy usage' (kilowatt hours KWhs) to generate a complete energy usage profile for reference purposes. For example, energy/utility credits may be awarded to those customer profiles that use such resources.

Figure 1:
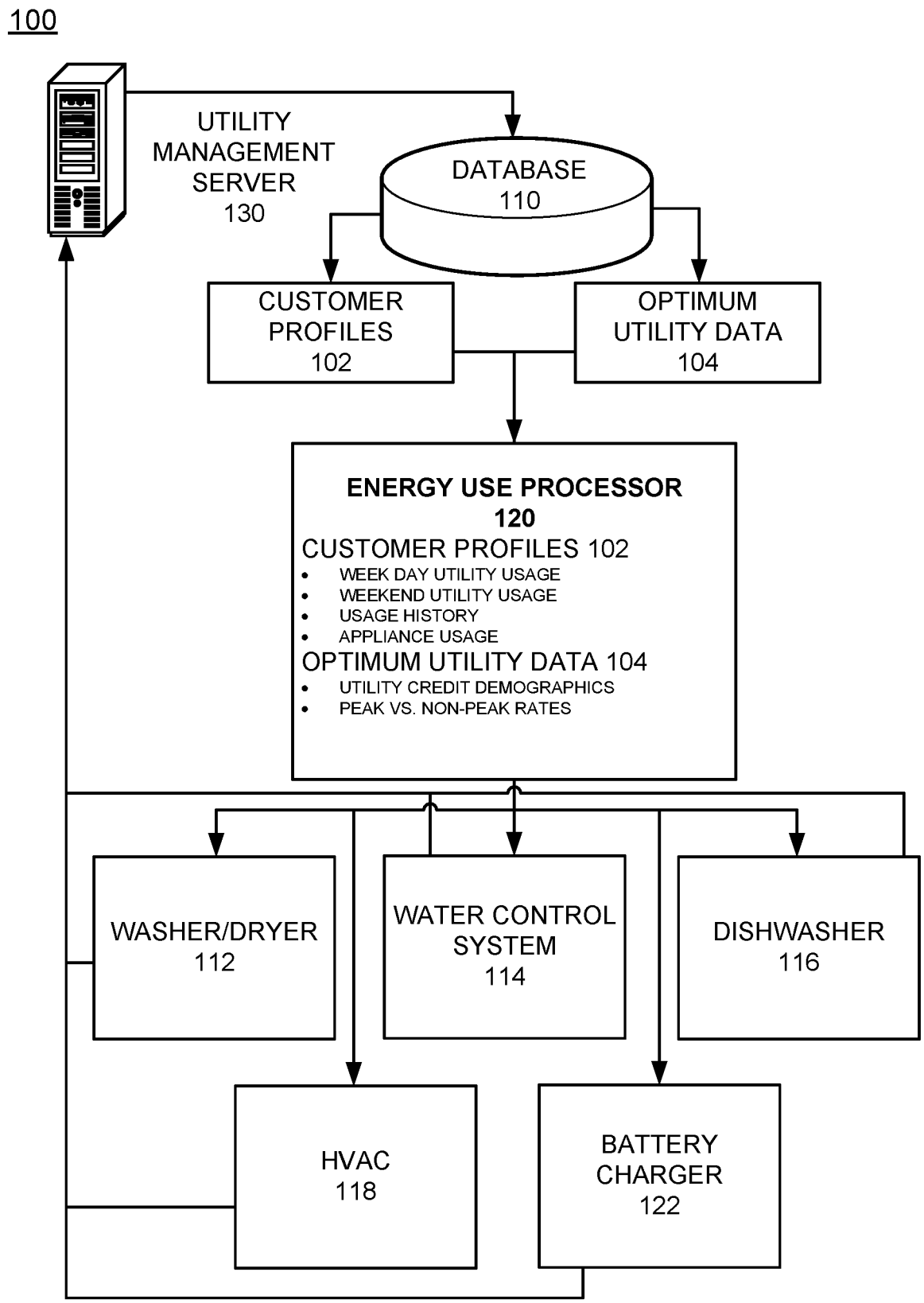
FIG. 1 illustrates an example network configuration for managing energy and utility resources according to example embodiments.

FIG. 1 illustrates an example network configuration for managing energy and utility resources according to example embodiments. Referring to FIG. 1, the network configuration 100 may include a utility management server 130 that stores customer profile data 102, such as historical and habitual energy/utility usage records, and optimum utility data 104, such as daily utility usage data, appliance use data, etc. and known credit time periods, such as non-peak usage times in a particular demographic, in a database 110. The term 'energy' may represent electrical power, water, gas and other utilities which are used and managed on a regular basis. An energy use processor 120 may represent a computing module that is responsible for receiving and updating customer usage profiles for accurate and updated records. Additionally, the systems utilized by a customer may include smart devices, such as a washer/dryer 112, a water control system 114, a dishwasher 116, a HVAC device 118 and a battery charger 122 for solar and/or battery powered power sources.

In operation, any time a customer uses one or more of the higher energy usage devices, a record may be maintained and stored to identify the usage profile times and instances of a particular customer. The devices themselves may wirelessly communicated their cycle information to the utility management server 130 each time they are engaged or initiated to begin a usage cycle.

Figure 2:
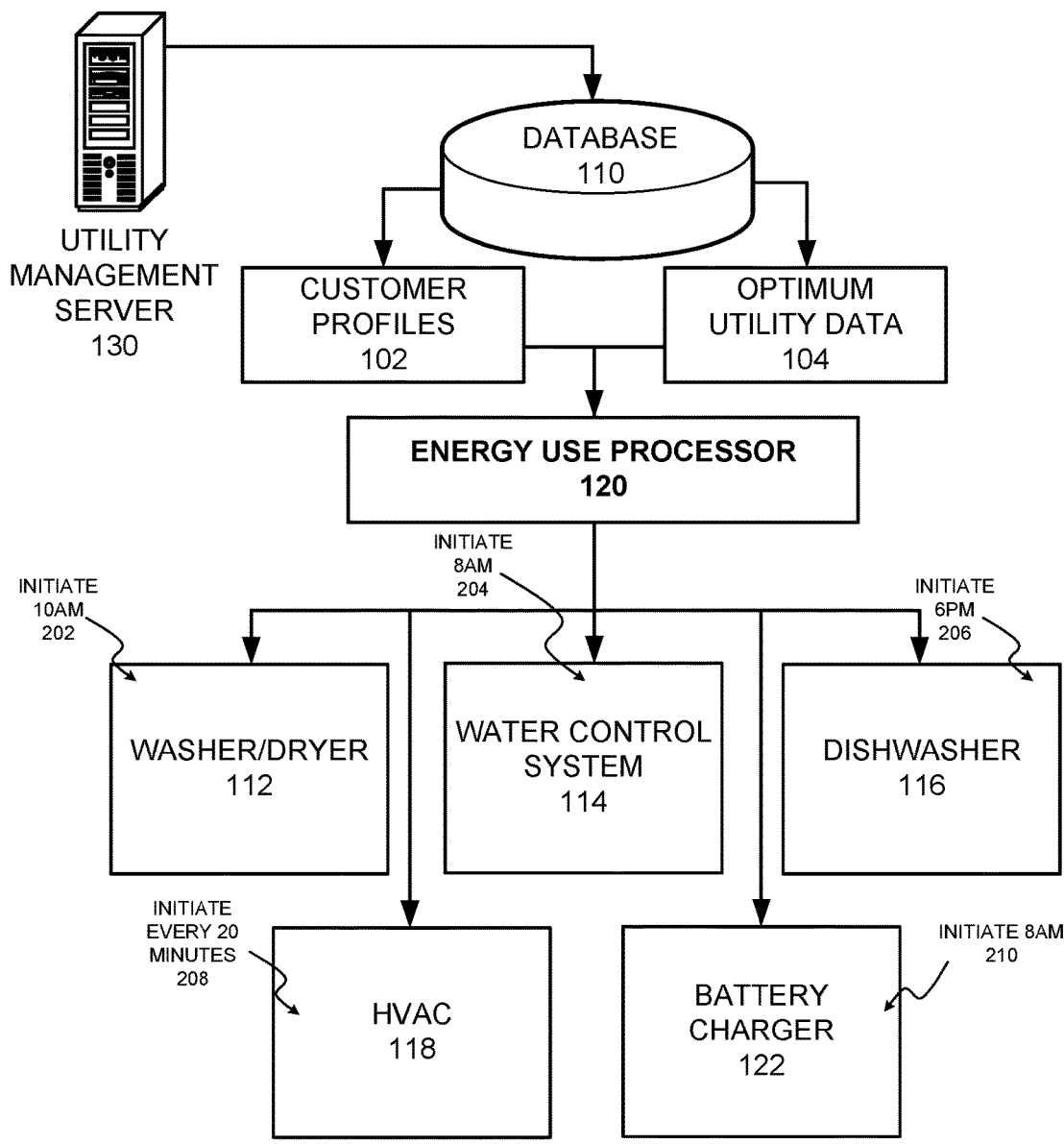
FIG. 2 illustrates an example energy and utility resource management configuration according to example embodiments.

FIG. 2 illustrates an example energy and utility resource management configuration according to example embodiments. Referring to FIG. 2, the configuration 200 includes an example where each of the high energy/resource/utility usage devices were initiated in a given 24 hour period. For example, the washer/dryer 112 may have been initiated at 10 AM 202, the water control system 114 (sprinkler control), may have been initiated at 8 AM 204, the dishwasher at 6 PM 206, the HVAC system every 20 minutes 208 and the battery charger 122 which charges a large high energy battery, may have been initiated at 8 AM 210. When the devices are initiated to begin a cycle of energy use, the devices may share the cycle information with the utility management server 130. The stored credits/deductions in the optimum utility data, which may include a reduced cost at certain time intervals (peak vs. non-peak), may be identified and applied to a current cycle, such as those identified during the times for a particular day.

Once the cycles are initiated by a person or automated computerized control system, such as an HVAC controller, an initiation signal may be sent wirelessly to a communication device, such as an in-home data network router or personal computing device, such as a laptop, tablet, watch, and/or smartphone, which receives and relays the information to the management server 130. The initiation signal(s) may identify a hardware address of the device being used, a current time and type of cycle selected. The management server 130 may effectively override/modify the cycle information depending on the customer profile 102 and optimum utility data 104. For example, if the washer/dryer cycle is initiated at 10 AM and that is considered part of a peak energy time period then the server may identify the peak time, identify that severity of a washer/dryer cycle (based on a severity value 1-5) can wait until later in the day and then postpone the cycle until the non-peak energy time period is available (e.g., after 7 pm). Another approach is to perform a partial cycle, such as a rinse via the washer 112, a partial dry via the dryer 112, a rinse via the dishwasher, etc., since water may not have a peak vs. non-peak cost time associated with its usage. A partial cycle may include a rinse with no further action until the non-peak time has matured.

In another example, the HVAC 118 may be required to continue cycling without interruption due to a known variable, such as the temperature being over 90 degrees. In this case, the severity level may be a '5' and the server 130 will take no action to reduce the cycle time or temperature sought by the HVAC controller. However, the server 130 may adjust the temperature or limit the cycle time during peak hours to permit cooling/heating but in a reduced capacity until the non-peak energy consumption time windows are made available for energy consumption, then the server 130 may honor the target temperatures without modification.

In the example with the dishwasher 116, the dishwasher may perform a partial cycle, such as a rinse cycle but not engage the high temperature drying which requires much larger amount of energy, until after the peak consumption times have lapsed and the more affordable instances have matured (i.e., energy cost reduction 'credit' time periods). In the example of the battery charger 122, the larger batteries used throughout the household, automobiles and other high voltage battery devices, may be initiated in the morning 210 and then modified by the server 130 to occur during non-peak hours. Any amount of customer history information may also be useful to know when the customer is at home or in the office and away from such locations. This permits decision making to be automated, about when to postpone consumption of energy and utilities, and to be based on knowledge of the optimal energy/utility consumption patterns of time and schedule.

Figure 3A:
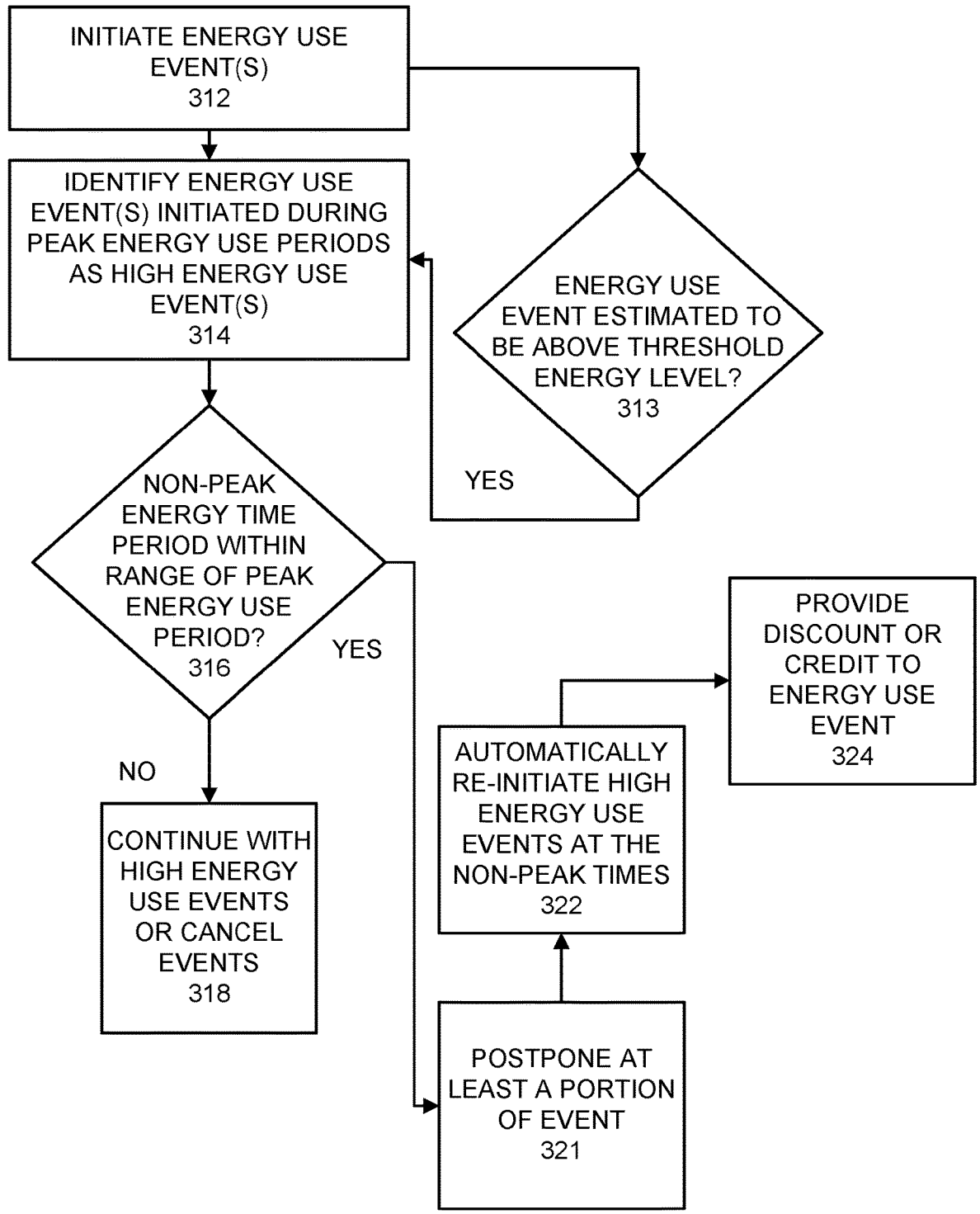
FIG. 3A illustrates an example logic flow diagram of an energy/utility management configuration according to example embodiments.

FIG. 3 illustrates an example logic flow diagram of an energy/utility management configuration according to example embodiments. Referring to FIG. 3, the example process 300 provides determining one or more high energy usage events were initiated during a peak energy usage time interval of a period of time 312, the events may be identified via a wireless communication signal sent from the devices that initiated an event. The server may identify those devices as high energy consumption devices 314 based on the types of cycles that were initiated, a record of the types of devices, historical use information etc. Such information may be used to perform a threshold comparison 313 to identify whether the event is likely to be a high energy event.

The process may further include determining whether a non-peak energy usage time interval is within a threshold range of the peak energy usage time interval 316, for example, the threshold range may be 1-8 hours which ensures the cycle will occur in a timely manner and the customer will not experience an undue delay in attempting to initiate an event cycle on the device. When the range is not feasible and exceeds the threshold time, the device will perform the event 318 without delay, and the server 130 may not attempt to modify the event cycle process since there is no feasible option to postpone the event in a timely manner. If, however, the range is within a set threshold amount of time, then the event may be postponed 321 for at least a portion of the event. This may include postponing any energy, water, gas usage at the current time until a more optimal time is available. The postponing may also include performing a reduced cycle event where only a portion of the event is performed at the current time and the rest is performed later during a non-peak time interval. At such a maturity time of non-peak energy costs, the high energy use event may be re-initiated to complete its cycle 322. The peak and non-peak energy usage may result in a discount or credit applied to a customer bill 324.

The process may also include detecting energy usage events over the period of time to establish a customer profile, determining one or more of the energy usage events has exceeded an energy usage threshold, assigning the one or energy usage events as the high energy usage events, and determining an energy usage profile of a customer based on the energy usage events detected during the period of time. The process may also include determining dwelling time periods of a day when the customer is located in a facility based on specific times associated with the detected energy usage events. The future recommended energy usage times to perform the future high energy usage events during the non-peak energy usage time interval are assigned during the one or more dwelling time periods of the day, and the postponing of at least a portion of the one or more high energy usage events during the peak energy usage time may include partially performing the high energy usage event during the peak energy usage time interval and partially performing the high energy usage event (i.e., a majority of the event) during the non-peak energy usage time interval. For example, 80 percent of the event energy is used during the non-peak times. The high energy usage event may include one or more of operating a clothing dryer, operating a dishwasher, operating an array of computers, operating a refrigeration device, charging a battery, operating a heating ventilation and air conditioning unit, and operating a high power consuming device. The process may also include creating schedule events corresponding to the future recommended energy usage times for a calendar application associated with the energy usage profile, and populating the calendar application with the schedule events. Also, the process may provide identifying an incentive to accept the future recommended energy usage times to perform the future high energy usage events during the non-peak energy usage time interval, and forwarding the notification with the incentive and the future recommended energy usage times.

Figure 3B:
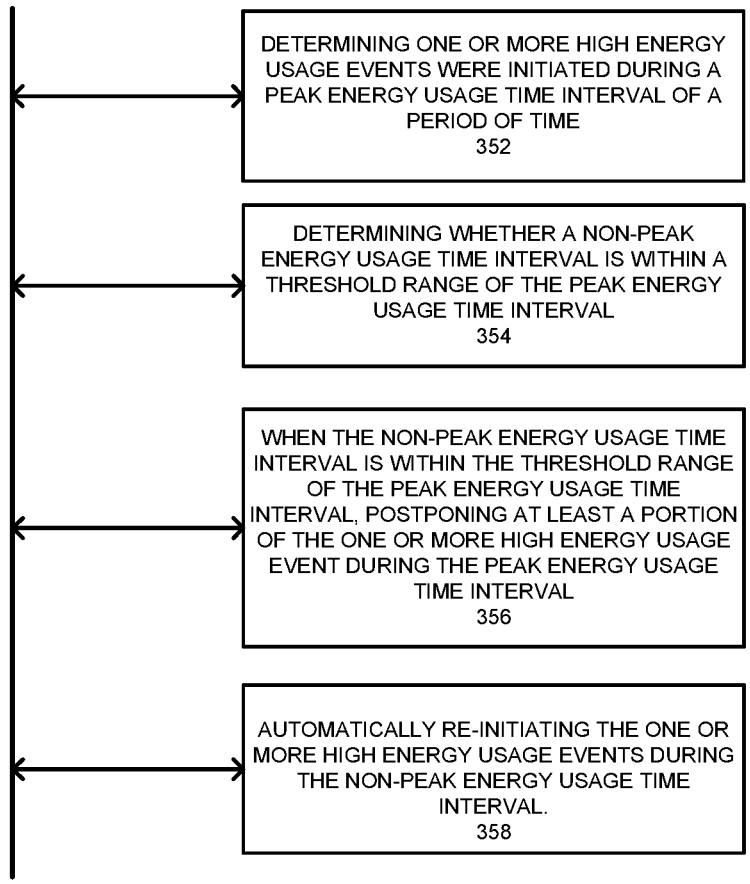
FIG. 3B illustrates an example logic flow diagram of an energy/utility management process according to example embodiments.

FIG. 3B illustrates an example logic flow diagram of an energy/utility management process according to example embodiments. Referring to FIG. 3B, the diagram 350 provides a process which includes determining one or more high energy usage events were initiated during a peak energy usage time interval of a period of time 352, determining whether a non-peak energy usage time interval is within a threshold range of the peak energy usage time interval 354, when the non-peak energy usage time interval is within the threshold range of the peak energy usage time interval, postponing at least a portion of the one or more high energy usage event during the peak energy usage time interval 356, and automatically re-initiating the one or more high energy usage events during the non-peak energy usage time interval 358.

Figure 4:
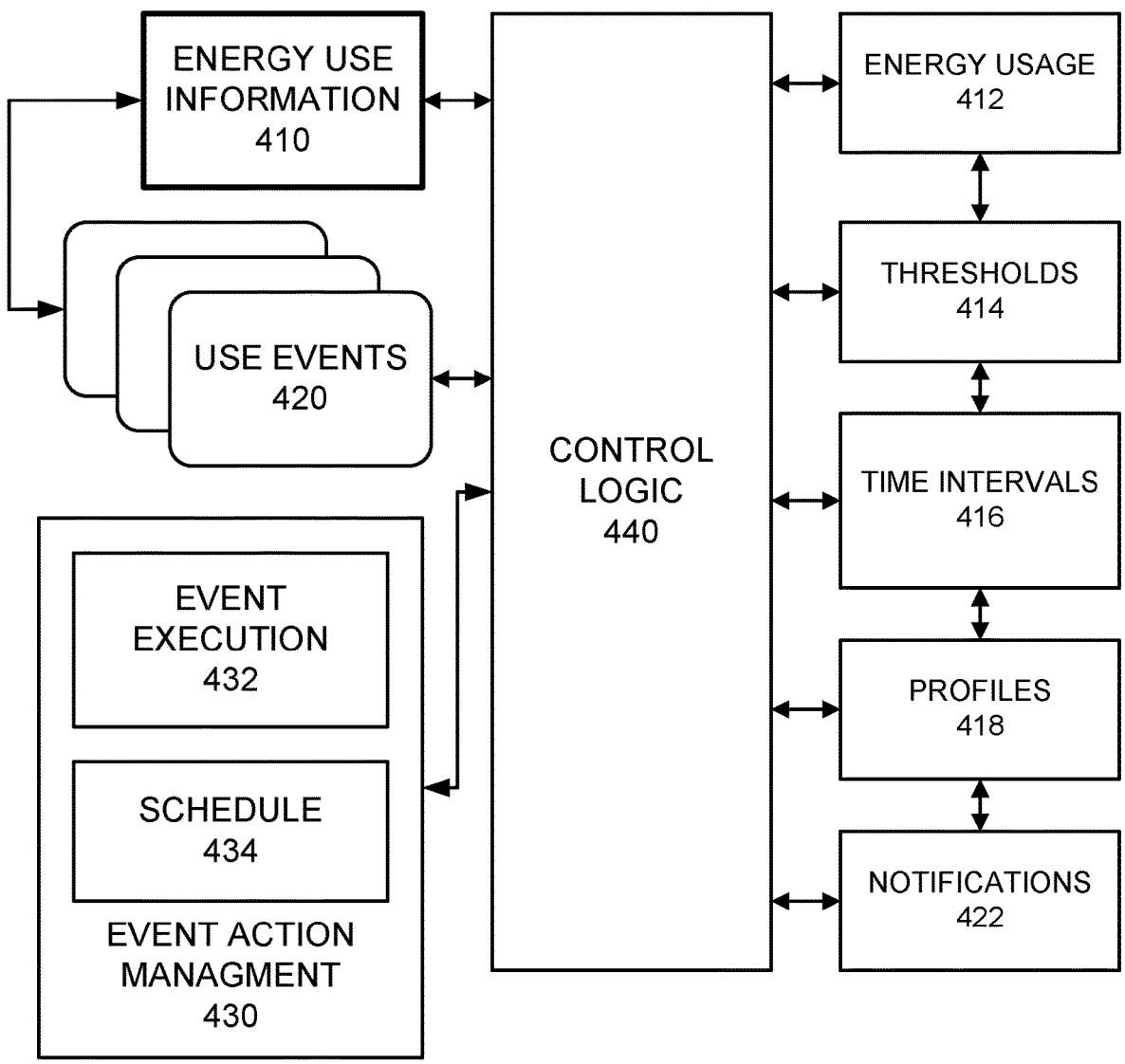
FIG. 4 illustrates an example logic control module configured to process energy/utility parameter inputs and outputs according to example embodiments.

FIG. 4 illustrates an example logic control module configured to process energy/utility parameter inputs and outputs according to example embodiments. Referring to FIG. 4, the configuration 400 may include various inputs, such as energy use information (i.e., optimal energy use times, non-optimal energy use times), use events 420, such as those initiated events or scheduled events, and an execution module 430 which may be event execution 432, postponed event, partially postponed event, a schedule 434 to adhere to the postponed events, etc. The control logic module 440 may be a processor of a computing device that executes the input parameters to generate certain output parameters, such as the energy usage calculation 412, thresholds of energy usage 414, time windows, etc., time intervals 416 for waiting or executing the events, customer profiles 418 with history information and notifications 422 for updating calendars and notifying interested parties of the event schedule.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components of the other figures.

Figure 5:
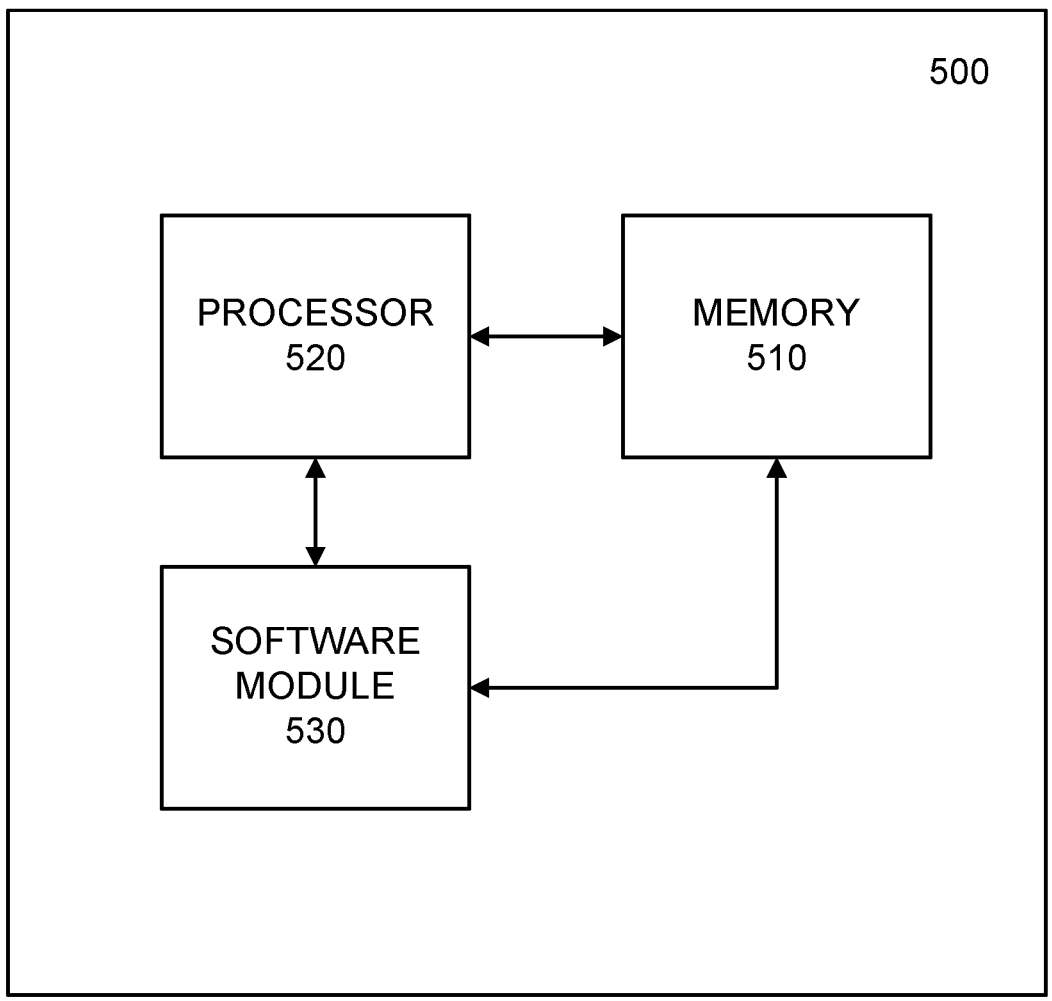
FIG. 5 illustrates an example network entity device configured to store instructions, software, and corresponding hardware for executing the same, according to example embodiments of the present application.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving, by a processor of an energy usage server, energy usage information of one or more devices at a location of a customer;
   identifying, via the processor, high energy usage events of the customer based on usage cycle times within the received energy usage information;
   establishing a wireless network communication channel between a heating ventilation and air conditioning (HVAC) controller from among the one or more devices and the energy usage server via a wireless network router;
   detecting, by the processor, energy usage events of the one or more devices over a period of time;
   determining, by the processor, one or more of the energy usage events has exceeded an energy usage threshold;
   in response to the determining, assigning, by the processor, the one or more energy usage events as high energy usage events; and
   storing, by the processor, information about the one or more high energy usage events in a customer profile,
   receiving, by the processor via the wireless network communication channel, an initiation signal from a device from among the one or more devices which identifies a hardware address of the device, a type of energy usage event that has been initiated by the device, a current time, and a type of usage cycle selected;
   determining, by the processor, that the energy usage event is a high energy usage event initiated during a peak interval of time based on the type of energy usage event and the current time which are included in the initiation signal;
   determining, by the processor, to perform an initial part of the usage cycle but delay a subsequent part of the usage cycle based on the determination that the energy usage event is a high energy usage event; and
   in response to the determination to perform an initial part of the usage cycle but delay a subsequent part of the usage cycle, controlling, by the processor, the device to perform the initial part of the usage cycle without starting the subsequent part of the usage cycle during the peak interval time, and further controlling, by the processor, the device to perform the subsequent part of the usage cycle during a non-peak interval of time;
   creating, by the processor, schedule events corresponding to future recommended energy usage times for a calendar application associated with the customer profile; and
   populating, by the processor, the calendar application with the created schedule events.

2. The method of claim 1, wherein the energy usage event comprises electricity consumption by one or more of a clothing dryer, a dishwasher, an array of computers, a refrigeration device, and a charging a battery.

3. An apparatus comprising:
   a network interface configured to receive energy usage of one or more devices at a location of a customer; and
   a processor configured to:
   identify high energy usage events of the customer based on usage cycle times within the received energy usage information;

establish a wireless network communication channel between a heating ventilation and air conditioning (HVAC) controller from among the one or more devices and the apparatus via a wireless network router;
detect energy usage events of the one or more devices over a period of time;
determine one or more of the energy usage events has exceeded an energy usage threshold;
in response to the determination, assign the one or more energy usage events as high energy usage events; and
store information about the one or more high energy usage events in a customer profile,
receive, via the wireless network communication channel, an initiation signal from a device from among the one or more devices which identifies a hardware address of the device, a type of energy usage event that has been initiated by the device, a current time, and a type of usage cycle selected;
determine that the energy usage event is a high energy usage event based on the type of energy usage event initiated and the current time which are included in the initiation signal;
determine that the energy usage event is a high energy usage event initiated during a peak interval of time based on the type of energy usage event and the current time which are included in the initiation signal;
determine, by the processor, to perform an initial part of the usage cycle but delay a subsequent part of the usage cycle based on the determination that the energy usage event is a high energy usage event; and
in response to the determination to perform an initial part of the usage cycle but delay a subsequent part of the usage cycle, control the device to perform the initial part of the usage cycle without starting the subsequent part of the usage cycle during the peak interval time, and further control the device to perform the subsequent part of the usage cycle during a non-peak interval of time;
create schedule events corresponding to future recommended energy usage times for a calendar application associated with the customer profile; and
populate the calendar application with the created schedule events.

4. The apparatus of claim 3, wherein the energy usage event comprises electricity consumption by one or more of a clothing dryer, a dishwasher, an array of computers, a refrigeration device, and a charging a battery.

5. A non-transitory computer readable storage medium configured to store instructions that when executed cause a processor to perform:

receiving energy usage information of one or more devices of a customer via an energy usage server;
identifying, via the energy usage server, high energy usage events of the customer based on usage cycle times within the received energy usage information;
establishing a wireless network communication channel between a heating ventilation and air conditioning (HVAC) controller from among the one or more devices and the energy usage server via a wireless network router;
detecting energy usage events of the one or more devices over a period of time;
determining one or more of the energy usage events has exceeded an energy usage threshold;
in response to the determining, assigning the one or more energy usage events as high energy usage events; and
receiving, by the energy usage server via the wireless network communication channel, an initiation signal from a device from among the one or more devices which identifies a hardware address of the device, a type of energy usage event that has been initiated by the device, a current time, and a type of usage cycle selected;
determining that the energy usage event is a high energy usage event initiated during a peak interval of time based on the type of energy usage event initiated by the device and the current time included in the initiation signal;
determining to perform an initial part of the usage cycle but delay a subsequent part of the usage cycle based on the determination that the energy usage event is a high energy usage event; and
in response to the determination to perform an initial part of the usage cycle but delay a subsequent part of the usage cycle, controlling the device to perform the initial part of the usage cycle without starting the subsequent part of the usage cycle during the peak interval time, and further controlling the device to perform the subsequent part of the usage cycle during a non-peak interval of time;
creating schedule events corresponding to future recommended energy usage times for a calendar application associated with the customer profile; and
populating the calendar application with the created schedule events.

6. The non-transitory computer readable storage medium of claim 5, wherein the energy usage event comprises electricity consumption by one or more of a clothing dryer, a dishwasher, an array of computers, a refrigeration device, and charging a battery.

* * * * *